United States Patent [19]
Gejoff

[11] 3,768,330
[45] Oct. 30, 1973

[54] ANTI-RATTLE GEARSHIFT LINKAGE MECHANISM FOR A MANUALLY CONTROLLED AUTOMOTIVE POWER TRANSMISSION MECHANISM

[75] Inventor: James T. Gejoff, Dearborn Heights, Mich.

[73] Assignee: Ford Motor Company, Dearborn, Mich.

[22] Filed: Apr. 4, 1972

[21] Appl. No.: 241,027

[52] U.S. Cl. .............................. 74/484, 74/473 SW
[51] Int. Cl. ............................................. G05g 9/12
[58] Field of Search ............... 74/484, 473 SW, 490

[56] References Cited
UNITED STATES PATENTS
3,025,714   3/1962   Bliss ..................................... 74/484
3,121,344   2/1964   Fodrea ............................... 74/484 X

*Primary Examiner*—Milton Kaufman
*Attorney*—Keith L. Zerschling et al.

[57] ABSTRACT

A gearshift linkage mechanism for a manually-controlled, three-speed transmission for an automotive vehicle including two ratio controlling shift levers mounted for rotary oscillation on the base of an automotive vehicle steering column, a gearshift selector sleeve shaft journalled for oscillatory and translatory movement on the steering column, one lever being adapted to control ratio changes between the low ratio and reverse drive ratio and the other lever being adapted to control ratio changes between the intermediate ratio and a high speed ratio, a bearing supporting rotatably the gearshift levers on the base of the column, a pair of clutch keys secured to the shift selector shaft, registering clutch keyways formed in each shift lever, a cam surface formed on one key which is adapted to register with a corresponding cam surface on one margin of the intermediate and high shift lever and spring means for urging the selector shaft and cammed key into engagement with the cooperating surface of the intermediate and high shift lever thereby preventing unwanted lost motion and rattling of the gearshift linkage when the transmission mechanism is conditioned for high speed ratio operation.

4 Claims, 13 Drawing Figures

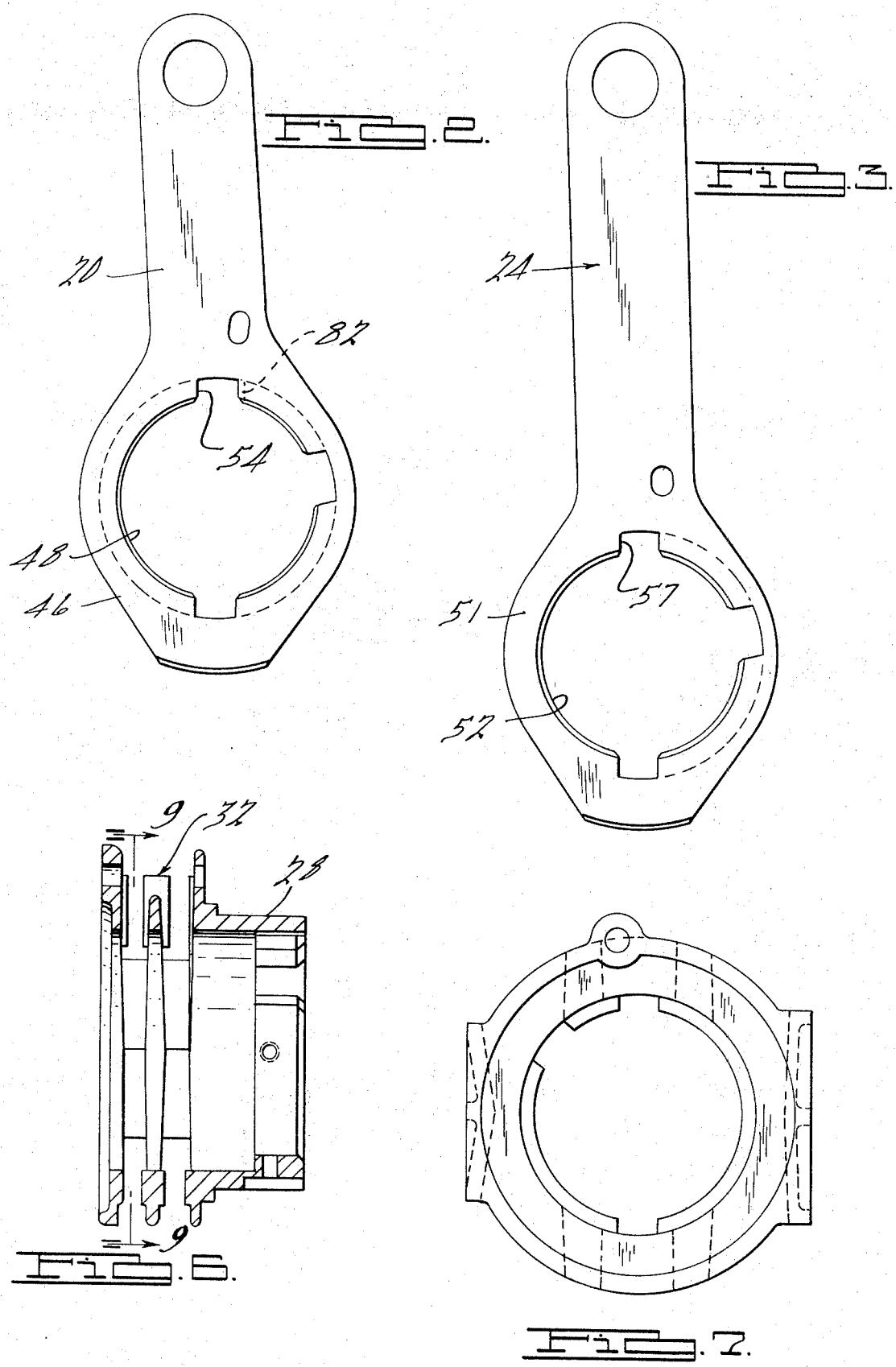

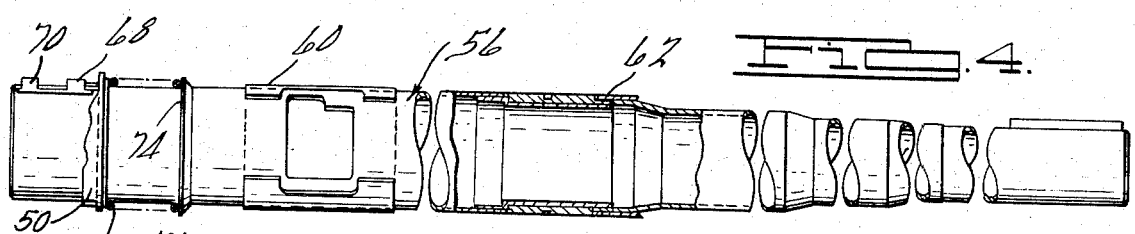
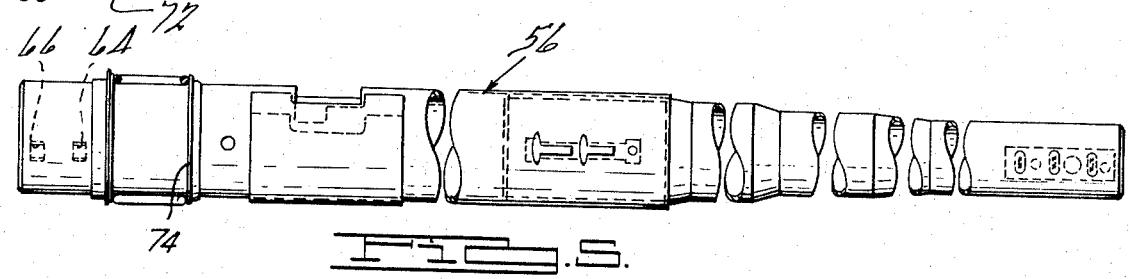
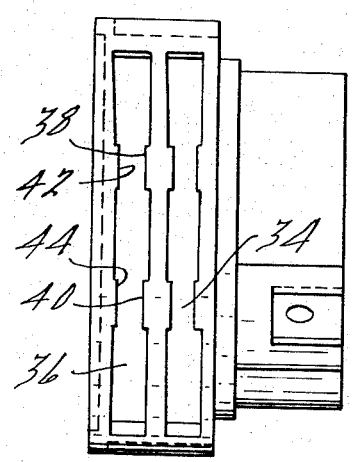
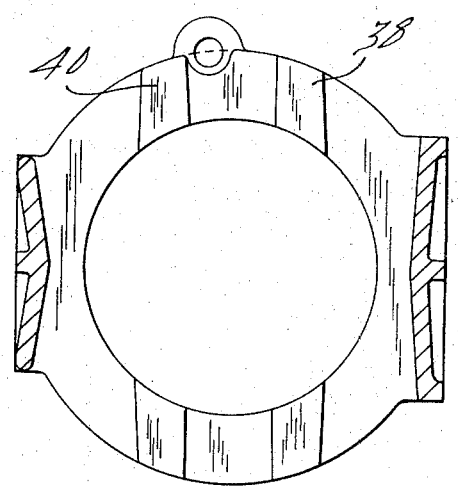
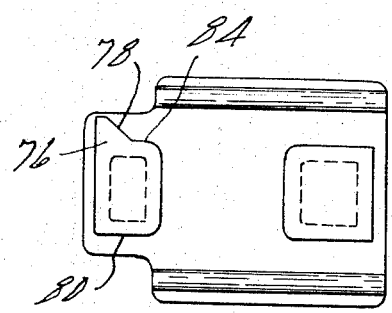
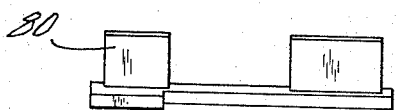

ANTI-RATTLE GEARSHIFT LINKAGE MECHANISM FOR A MANUALLY CONTROLLED AUTOMOTIVE POWER TRANSMISSION MECHANISM

GENERAL DESCRIPTION OF THE INVENTION

My invention is an improvement in well known manual gearshift linkage mechanisms used in the automotive industry. Manually controlled transmissions used in automotive vehicle drivelines include gearshift levers mounted for oscillation on the exterior of the transmission housing. These are connected through transmission shift rods to shift levers that are mounted for oscillation on the base of the vehicle steering column. The steering column supports the steering wheel and the steering shaft that is connected through a steering gear mechanism to the dirigible wheels of the vehicle. A gear-shift selector shaft also is journalled on the steering column and is adapted to be clutched selectively to either one or the other of the shift levers mounted on the base of the column. One lever is used for controlling ratio changes between low ratio and reverse ratio and another shift lever is used for controlling ratio changes between the intermediate ratio and the high speed ratio. These mechanisms usually include a key connected to the transmission selector shaft. The shift levers include keyways that are adapted to register with the shift key. As the shift lever is moved in one direction, clutching engagement occurs between the selector shaft and one shift lever. Upon rotary motion of the selector shaft, ratio changes effected by the shift lever can take place. If the shift lever then is returned to a so-called neutral position, the shift lever can be adjusted axially so that the key will be adapted for rotary motion on a different plane. At this time the other shift lever is clutched to the selector shaft. Upon the rotary motion of the selector shaft and the other shift lever, other ratio changes are accomplished.

In the improvement of my invention I have provided a cam on a key portion which is adapted to register with a cam keyway of the intermediate-and-high speed ratio shift lever. The registering cam surfaces are urged into clutching engagement by a spring that normally urges the selector shaft toward the base of the steering column. The registering surfaces of the cam portion of the intermediate-and-high shift lever and the cam surface of the cooperating selector key are urged into engagement by the spring thereby preventing unwanted stray motion of the shift lever when the transmission is operating in the high speed ratio. Heretofore, wear of the clutch element for the shift levers and the selector shaft causes a considerable amount of lost motion which induces an undesirable rattling of the linkage system due to vibrations. Elimination of this lost motion thus results in elimination of the noise and reduces maintenance costs. Reliability of the gearshift linkage mechanism also is improved since the elimination of the lost motion reduces the rate of wear and reduces the possibility of misalignment between the selector shaft and the operating shift levers which would impede ratio selection by the vehicle operator.

GENERAL DESCRIPTION OF THE FIGURES OF THE DRAWING

FIG. 2 shows an intermediate and high shift lever for use in the assembly of FIG. 1.

FIG. 3 shows a low and reverse shift lever for use in assembly of FIG. 1.

FIG. 4 shows a gearshift selector shaft journalled on the steering column.

FIG. 5 is a plan view of a shaft of FIG. 4.

FIG. 6 is a cross-sectional view of a bearing hub for supporting the gearshift selector shaft of FIGS. 4 and 5.

FIG. 7 is an end view of the hub of FIG. 6.

FIG. 8 is a plan view of the hub of FIG. 6.

FIG. 9 is a cross-sectional view taken along the plane of section line 9—9 of FIG. 6.

FIGS. 10 and 10A are detailed views of the clutch keys shown in FIG. 4.

PARTICULAR DESCRIPTION OF THE INVENTION

Figures 1, 1A, 1B:
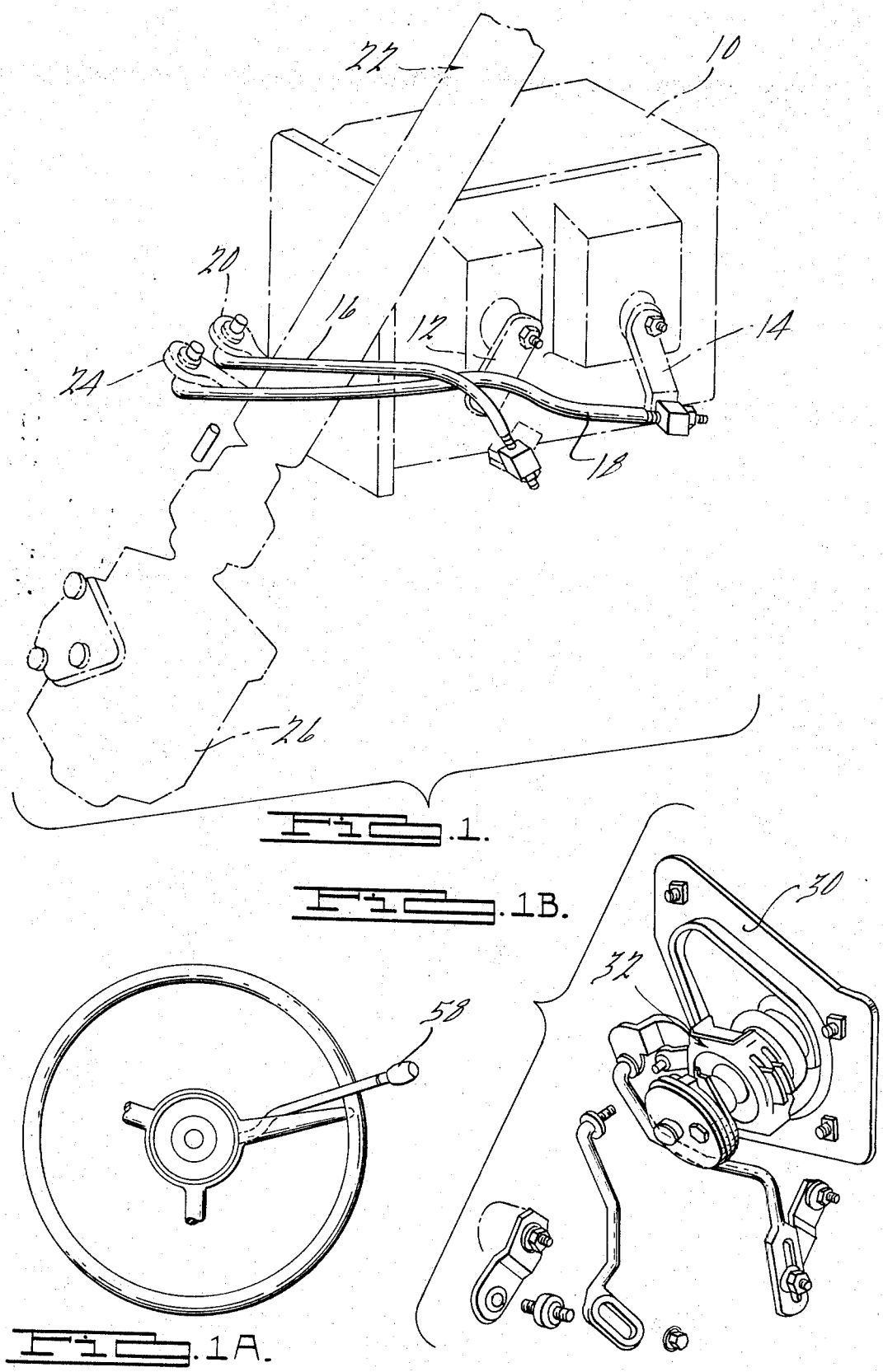
FIG. 1 shows in isometric form the base of the steering column for an automotive vehicle and a manually controlled transmission mechanism.
FIG. 1A shows a vehicle steering wheel and transmission selector lever which is supported on a steering column shown in FIG. 1.
FIG. 1B is an enlarged view in isometric form of the shift lever assembly mounted on the base of the steering column of FIG. 1.

FIG. 1 shows a manually controlled automotive transmission housing 10. Journalled on the housing are shift levers 12 and 14. Lever 12 controls ratio changes between the second and third speed ratios and lever 14 controls ratio changes between first and reverse ratios. Lever 14 is actuated by shift rod 16 and lever 14 is actuated by shift rod 18. Rod 16 is connected to shift lever 20 journalled for oscillation on the base of steering column 22. Shift rod 18 is connected to shift lever 24 also journalled for oscillation on the base of steering column 22.

The steering gear for the vehicle is designated generally by reference character 26. The input gear element for the steering gear 26 is connected drivably to a steering shaft which forms a part of the steering column assembly 22.

FIG. 6 shows a die cast metal hub including a sleeve 28 that is received within a stationary housing portion of the column 22. The column can be connected to the forward wall of the vehicle body that separates the engine compartment from the vehicle passenger compartment. For this purpose a supporting bracket 30 surrounds the steering column 22 and is bolted to the wall. This can be seen best in FIG. 1B.

The hub shown in FIG. 6 is identified in FIG. 1B by reference character 32. The hub is of generally circular configuration. It includes a pair of transverse slots 34 and 36 as best seen in FIG. 8. As best seen in FIG. 9, the hub 32 defines bearing surfaces 38 and 40. These bearing surfaces are situated on one side of the slot 36. Corresponding bearing surfaces 42 and 44 are situated on the opposite side of the slot. Slot 34 also has bearing surfaces that correspond to the bearing surfaces 38 through 44. Lever 24 extends through the slot 36 and is adapted to slide against the cooperating bearing surfaces. Lever 20 is adapted to extend through slot 34 and is adapted to register with the cooperating bearing surfaces for that slot.

The intermediate-and-high shift lever 20 is shown at FIG. 2. It includes a hub 46 having a circular opening 48 through which is received a relatively stationary sleeve shaft 50 which is shown in FIG. 4 and in FIG. 5. FIG. 3 shows the low and reverse shift lever 24. It includes a hub 51 which has a circular opening 52 for receiving the stationary sleeve shaft 50. The hub 46 has a keyway 54 in the opening 48 and the hub 51 has a corresponding keyway 57 in the opening 52. of the The ends of 20 and 24 have apertures as indicated in FIGS. 2 and 3, respectively, to permit driving connections with the ends of the shift rods 16 and 18.

The gearshift selector shaft, which is designated generally by reference character 56 in FIGS. 4 and 5, is adapted to be moved longitudinally by the vehicle operator and rotated about its axis. This adjustment is accomplished in a well known fashion by means of a cane type shift lever 58 as indicated in FIG. 1A. The shaft 56, which is hollow, may be supported in suitable fashion at spaced bearing points such as at locations 60 and 62.

The left-hand end of the shaft 56 is apertured as shown at 64 and 66 in FIG. 5. The clutch elements or keys 68 and 70 extend through the openings 64 and 66, respectively. These may be joined together as part of an integral clutch element, which is projection welded to the inner surface of sleeve shaft 56. They are shifted axially upon axial movement of the shaft 56. The keys 68 and 70 are adapted to register with keyways 54 and 57 in the levers 20 and 24 respectively.

The compression spring 72 is interposed between the stationary sleeve shaft 50 and shoulder 74 carried on shaft 56.

As indicated best in FIGS. 10 and 10A, the key or clutch element 70 is formed with a cam 76 having a surface 78 on one side thereof. On the opposite side is a flat surface 80 arranged in a plane parallel to the axis of the shaft 56.

Lever 20 is provided with a cam surface 82 on one side of the keyway 54. Cam surface 82 is adapted to register with cam surface 78 when the spring 72 urges the shaft 56 in a right-hand direction, as viewed in FIG. 4, which corresponds to the upward direction when the column is viewed in FIG. 1. This maintains a positive driving relationship between the shaft 56 and the second and third ratio shift lever 20 when the transmission is conditioned for high speed ratio operation.

When the shaft 56 is moved in a downward direction, element 70 becomes disengaged from the lever 20 and element 68 becomes engaged with the keyway 57 in the lever 24. Upon rotation of the shaft 56, lever 24 can be moved between the low and reverse ratio positions.

The camming engagement established by the cam surfaces 78 and 82 prevents undesirable lost motion between the shaft 56 and lever 20, thereby eliminating rattle of lever 20 and other unwanted vibrations that occur due to wear in the linkage system. Torque may be transmitted readily from the shaft 56 to the lever 20 by reason of the driving connection established between the side 80 and the cooperating side of the keyway 54. Torque in the opposite direction can be delivered from the shaft 56 to the lever 20 by reason of the positive engagement of the flat surface 84 on the clutch element 70 and the adjacent side of the keyway 54.

Having described a preferred form of my invention, what I claim and desire to secure by U.S. Letters Patent is:

1. In a gearshift linkage mechanism for an automotive vehicle having a steering column and a multiple ratio transmission;

a ratio selector shaft mounted for rotation and for axial movement on said steering column, a ratio shift lever journalled at the lower end of said column, a clutch element in the form of a key carried by said lower end of said ratio selector shaft and extended generally in a radial direction, said shift lever having a radially inward end encircling said steering column, said inward end having an opening through which said steering column is received, a keyway in said opening adapted to register with said key as said ratio controlling shaft is moved axially, the radially outward end of said shift lever being adapted to be connected mechanically to ratio controlling elements of said transmission, a cam surface formed on said key on one side thereof, the opposite side of said key having a generally flat surface arranged in a plane generally parallel to the axis of said steering column, the opposite side of said key being defined by said cam surface and by a flat surface generally parallel to the axis of said steering column, said cam surface being adapted to register with a cooperating cam surface formed on one edge of said keyway, and spring means for urging said ratio selector shaft in an upward direction thereby maintaining said cam surfaces in registry thus eliminating unwanted lost motion between said shift lever and said ratio selector shaft.

2. The combination as set forth in claim 1 wherein the edge of said keyway is formed with said cooperating cam surface having generally the same angular disposition as the cam surface on said key whereby the spring force acting in an axial direction on said ratio selector shaft introduces a torque component acting on said shift lever tending to maintain said shift lever in a generally fixed position with respect to said ratio selector shaft.

3. In a gearshift linkage mechanism for an automotive vehicle having a steering column and a multiple ratio transmission;

a ratio selector shaft mounted for rotation and for axial movement on said steering column, a ratio shift lever journalled at the lower end of said column, a clutch element in the form of a key carried by said lower end of said ratio selector shaft and extended generally in a radial direction, said shift lever having a radially inward end encircling said steering column, said inward end having an opening through which said steering column is received, a keyway in said opening adapted to register with said key as said ratio controlling shaft is moved axially, the radially outward end of said shift lever being adapted to be connected mechanically to ratio controlling elements of said transmission, a cam surface formed on said key on one side thereof, the opposite side of said key having a generally flat surface arranged in a plane generally parallel to the axis of said steering column, the opposite side of said key bieng defined by said cam surface and by a flat surface generally parallel to the axis of said steering column, said cam surface being adapted to register with a cooperating cam surface formed on one edge of said keyway, spring means for urging said ratio selector shaft in an upward direction thereby maintaining said cam surfaces in registry thus eliminating unwanted lost motion between said shift lever and said ratio selector shaft,
a second shift lever mounted adjacent said first shift lever for oscillation about a common axis,
a second clutch element in the form of a second key, said second shift lever having a circular opening through which said ratio selector shaft is received, a second keyway in said second opening adapted to register with said second keyway in said second opening adapted to register with said second key as said ratio controlling shaft is moved axially, said second key moving out of the plane of oscillation of said second shift lever on one side of said second shift lever as said first key is moved into registry with said first keyway whereby said first shift lever controlling be rotated by said ratio contorlling shaft as said second shift lever remains stationary.

4. The combination as set forth in claim 3 wherein said first shift lever is adapted to control ratio changes between the high speed ratio and an intermediate speed ratio and said second shift lever is adapted to control ratio changes between a low speed ratio and a reverse speed ratio.

* * * * *

UNITED STATES PATENT OFFICE
CERTIFICATE OF CORRECTION

Patent No. 3,768,330　　　　　　　　Dated October 30, 1973

Inventor(s) James T. Gejoff

It is certified that error appears in the above-identified patent and that said Letters Patent are hereby corrected as shown below:

Column 2, line 30, cancel "14" (first occurrence) and substitute --12--.

Column 4, line 11, cancel "controlling" and substitute --selector--; lines 18 and 19, cancel "opposite" and substitute --one--; line 52, cancel "controlling" and substitute --selector--; lines 59 and 60, cancel "opposite" and substitute --one--.

Signed and sealed this 15th day of April 1975.

(SEAL)
Attest:

RUTH C. MASON
Attesting Officer

C. MARSHALL DANN
Commissioner of Patents
and Trademarks